April 3, 1951 G. W. HORNER ET AL 2,547,007
ANTISKID DEVICE FOR VEHICLE TIRES
Filed May 14, 1948 2 Sheets-Sheet 1
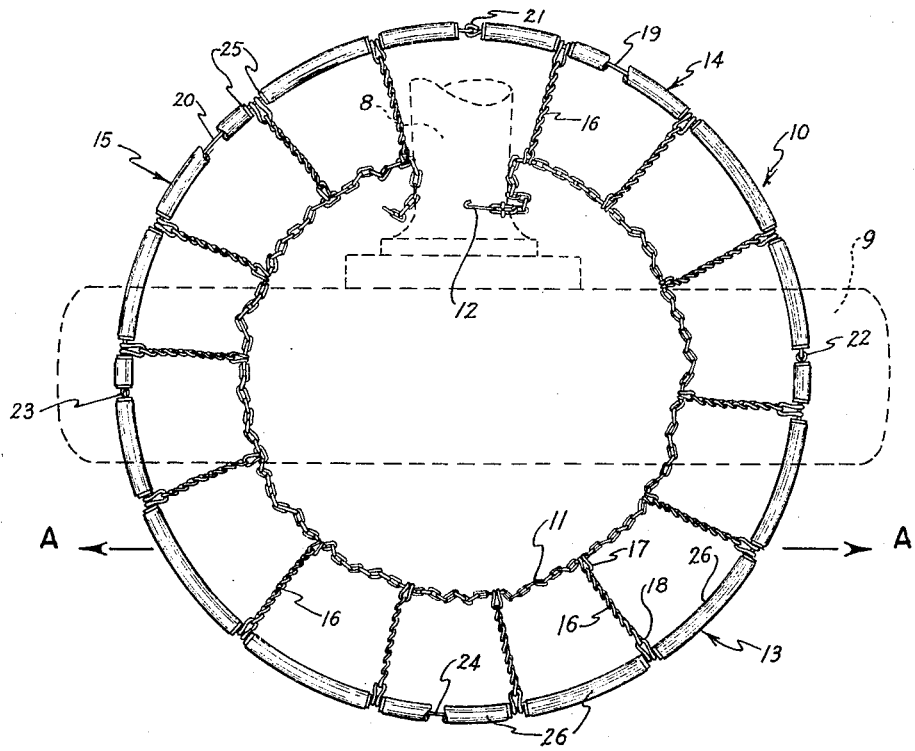
FIG.—1
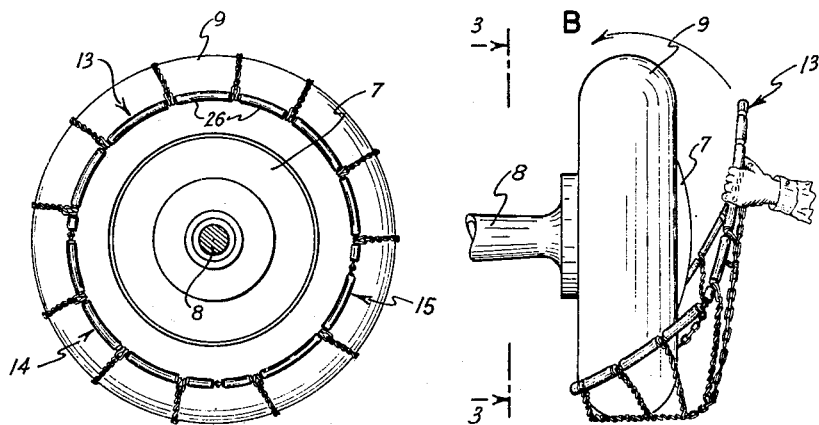
FIG.—3  FIG.—2
*INVENTORS*
George W. Horner &
Walter R. Robertson Sr.
BY *W. A. McGrew*
ATTORNEY April 3, 1951 G. W. HORNER ET AL 2,547,007
ANTISKID DEVICE FOR VEHICLE TIRES
Filed May 14, 1948 2 Sheets-Sheet 2
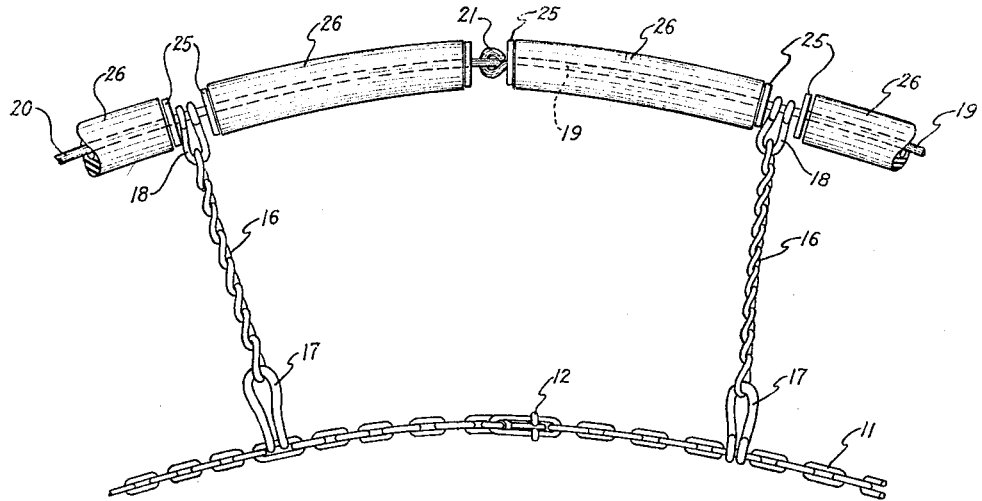
FIG.—4
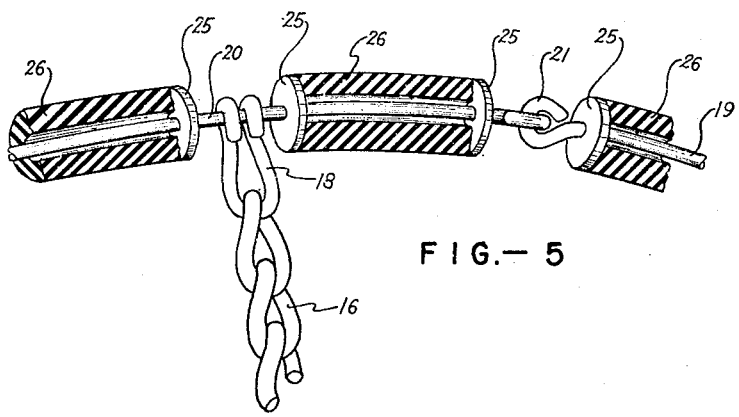
FIG.—5
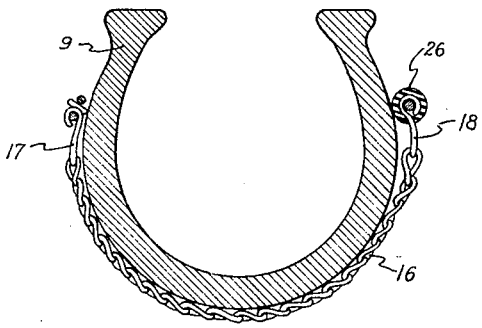
FIG.—6
*INVENTOR.*
George W. Horner &
Walter R. Robertson Sr.
BY *H. A. McGrew*
ATTORNEY Patented Apr. 3, 1951

2,547,007

UNITED STATES PATENT OFFICE 2,547,007

ANTISKID DEVICE FOR VEHICLE TIRES

George W. Horner and Walter R. Robertson, Sr., Idaho Springs, Colo.

Application May 14, 1948, Serial No. 27,058

10 Claims. (Cl. 152—242)

The present invention relates to an anti-skid device for vehicle tires. It has to do particularly, although not exclusively, with anti-skid devices adapted to be applied to the rear wheels of a pleasure type motor vehicle in which the skirts of the rear fenders extend downwardly considerably below the wheel hubs and axle.

As is well known, with conventional anti-skid chains for application to vehicle tires, it is virtually impossible to apply a chain to a mounted tire without first jacking up the wheel upon which the tire is mounted. Even when so elevated by a jack, it is difficult to properly apply or install a conventional chain to the tire and adjust it properly to prevent its biting into the tread of the tire or becoming loose and disengaged entirely or partially, from the tire.

One of the objects of the present invention is to provide an improved anti-skid device for vehicle tires which may be quickly and easily applied to a mounted tire on a rear wheel of a vehicle without necessitating the jacking up or elevating of the wheel and tire with relation to the road surface.

Another object of the present invention is to provide an improved anti-skid device of the foregoing character in which the inner circumferential member or portion of the device normally remains in a true circle, or substantially a true circle, but which may be deformed into substantially an oval shape or condition to permit its ready application to a mounted tire.

A further object of the present invention is to provide an improved anti-skid device for vehicle tires in accordance with the preceding paragraphs, in which the inner circumferential side member or portion of the device is provided with a series of closely spaced non-metallic sections of tubing, such as rubber or synthetic rubber tubing, which tubing facilitates the application of the device to the mounted tire and which contacts the inner side wall of the tire after the device has been installed to thus prevent damage to said wall during use.

Another object of the present invention is to provide an improved anti-skid device for vehicle tires as aforesaid, in which the device includes a plurality of cross chains connecting an outer circumferential side chain and an inner circumferential member or portion, in which the cross chains are provided with inner hook-like members for engagement with the inner circumferential member which is relatively smaller than the outer hook-like members which engage the outer circumferential side chain, thus reducing the possibility of wear upon the inner side wall of the tire.

The foregoing and other objects and advantages of the present invention will be apparent from the following description and appended claims when considered in conjunction with the accompanying drawings forming a part of this specification wherein like reference characters designate corresponding parts in the several views.

In said drawings:

Fig. 1 is a top plan view of one embodiment of the present invention and showing the anti-skid device of the present invention in position with relation to a tire and vehicle rear axle prior to installation upon said tire.

Fig. 2 is a fragmentary rear end elevational view of a rear tire and vehicle rear axle, illustrating one position of the parts and one step in the operation of installing the anti-skid device of the present invention upon said tire.

Fig. 3 is an elevational view, partly in section, taken substantially along the line 3—3 of Fig. 2, looking in the direction of the arrows and showing the anti-skid device of the present invention installed properly upon the tire of Fig. 2.

Fig. 4 is an enlarged fragmentary top plan view of a length of the anti-skid device embodying the present invention.

Fig. 5 is a fragmentary detail perspective view, partly in section, illustrating details of the inner circumferential member of the anti-skid device; and Fig. 6 is a vertical transverse section through an unmounted tire illustrating the relationship of the anti-skid device of the present invention to the tire when installed upon said tire.

Before explaining in detail the present invention, it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

Referring now particularly to Fig. 1 of the drawings, there is shown as a whole at 10 one of the anti-skid devices for vehicle tires embodying the present invention. In this figure, the device is shown in its normally circular shape supposedly resting upon the surface of the ground and being disposed in relation to the rear axle 8 of the vehicle and the tire 9 mounted upon the left rear wheel of a vehicle, such as the wheel 7, shown in Fig. 3.

The anti-skid device 10 comprises, as shown, an ordinary outer circumferential side chain 11 having a conventional chain-end fastening device 12. In lieu of the conventional inner circumferential side chain, there is provided the improved inner circumferential member of the device of the present invention. This member, as shown, comprises a semi-circular half section, shown as a whole at 13 and two curved quarter sections, each shown as a whole at 14 and 15. The outer conventional side chain 11 and the inner circumferential member consisting of the three sections 13, 14 and 15 are connected together at spaced intervals by means of cross chains 16. Each of the cross chains 16 carries at its outer end a hook-like member 17 which is engaged with and clamped to one of the links of the conventional outer side chain 11. The inner or opposite end of each cross chain 16 carries a relatively smaller hook-like member 18 which is engaged with one of the circumferential wire members 19, 20 or 24 disposed at the inner side of tire 9. These relatively smaller hook-like members are clamped to the wire members but are free to have limited lengthwise movement on said wire members.

The sections 14 and 15 of the inner circumferential member comprise quarter sections or pieces 19 and 20 of relatively heavy gauge wire whose ends are looped and secured together at 21 to permit relative movement of the sections of the wire portions 19 and 20. The opposite ends of the wire quarter sections or pieces 19 and 20 are preferably secured in like manner at 22 and 23, see Fig. 1, to a semi-circular half section or piece of wire 24 forming a part of the portion 13 of the structure. This wire section 24 may be seen where parts are broken away at the bottom of Fig. 1.

Mounted upon the wire quarter sections 19 and 20 and the wire half section 24 are a series of pairs of metallic washers or perforated disc-like members 25. These disc-like members or washers 25 provide bearing surfaces for the opposite ends of non-metallic sleeve members 26 which are telescoped over the wire members 19, 20 and 24, and the washers are thus disposed, in pairs, in position adjacent opposite ends of each of the tubular members or sleeve 26. These tubular members are preferably formed from rubber or synthetic rubber, but may be formed from any other suitable non-metallic material, such as plastic, if desired. They serve the purpose of providing frictionless members for engaging the tire as the device is applied to it and also provide non-metallic surfaces to reduce the wear upon the inner side wall of the tire 9 when the device is applied, as shown in Fig. 3.

The metallic washers 25, arranged in pairs as stated, serve as wear plates or members to prevent the clamped hook-like ends 18 of cross chains 16 from wearing the ends of the non-metallic sleeves 26. It is to be noted that the hook-like members 18 are disposed between virtually each of the pairs of washers 25. Where, however, the wire half section and the wire quarter sections are movably secured together at 21, 22 and 23, it will be seen that these connections are disposed between pairs of washers. Thus, the washers at these points prevent the looped ends or eyes of adjacent wire members from biting into the material of the sleeves.

It is to be noted that the wire half section 24 of part 13 extends from the coupling point 22 to the similar coupling point 23; that wire quarter section 19 of part 14 extends from coupling point or member 22 to coupling or connection 21; and that wire quarter section 20 of part 15 extends from coupling 21 to coupling 23, see particularly Fig. 1 of the drawings.

Since the greatest strain and thus possible wear is exerted upon the inner side wall of the tire, clamping hook-like members 18 are preferably smaller than the similar hook-like members 17 which attach the cross chains 16 to the conventional outer side chain 11.

In applying the anti-skid device of the present invention to a tire mounted upon the rear wheel of a vehicle, the entire device is preferably laid flat upon the ground surface as indicated in Fig. 1, and the vehicle backed or otherwise moved so that the left rear wheel 8 and tire 9 will be disposed over the device, as indicated in broken lines in Fig. 1. It will be noted that in this position, the open ends of the conventional circumferential outside chain 11, carrying the fastening device 12, may be disposed beneath the axle 8 and that the half section 13 is at the outside of the wheel 8, with the quarter sections 14 and 15 being disposed inside the wheel or away from the person who is to apply the anti-skid device to the tire 9.

With the parts in the position as shown in Fig. 1, the operator grasps the device in the vicinity of connections or couplings 22, 23 and moves the outside circular member 13, 14, 15 outwardly in opposite directions, as indicated by the arrows A in Fig. 1. This causes the entire device to assume a generally oval shape or formation (not shown) lengthwise of the wheel and tire. The half section 13 is now grasped adjacent the opposite ends thereof by the left and right hands of the operator, only the left hand of the operator being indicated in Fig. 2 of the drawings, and the sectioned member pulled outwardly and elevated vertically, as seen in Fig. 2, with the half section portion 13 thereof being lifted over tire 9 in the direction of arrow B in Fig. 2. The break in chain 11 has permitted the side chain to be spread and the device to be moved into its oval form. This makes it easier to shift the device from its position upon the ground into its position in engagement with the tire 9, this installed position being clearly shown in Fig. 3 of the drawings. When so applied, it will be seen that the sectioned or inner circumferential portion of the device is disposed against the inside wall of the tire, with the rubber tubes 26 engaging said side wall. The conventional outer circumferential side chain 11 is disposed against the outer wall of the tire and the ends of this side chain are brought together and fastened by the fastening device 12.

When it is desirable to remove the anti-skid device from tire 9, the operation above described is substantially reversed, after the fastening device 12 has been released to permit the sectioned portion of the device to be lifted and moved over the top of the tire and returned to its original or starting position, as indicated in Fig. 1 of the drawings. The vehicle is then moved to remove the wheel and tire from its position overlying the device, whereupon the device may be picked up and placed in the rear deck or trunk of the vehicle for future use.

While most of the sleeve members 26 are of substantially the same length, their length may be varied, of course, in accordance with the size of the anti-skid device, which size is, of course, dependent upon the particular size tire with which the device is to be used. While the inner circumferential member has been shown and described as comprising the half section 13 and the quarter sections 14 and 15, the quarter sections may be further divided, if desired, although it is preferable to have at least one of the sections constituting a half circle or half portion of the whole.

The couplings between the wires 19, 20 and 24 of sections 13, 14 and 15, are shown as being simply loops shaped by a suitable tool to provide interlocked eyes. Other means may be provided, if desired, for movably connecting these wire pieces or sections together at the points 21, 22 and 23.

Having thus described the invention, what is claimed is:

1. An anti-skid device for vehicle tires, comprising an outer circumferential side chain composed of a plurality of links and a fastener for the separable ends of said side chain, an inner circumferential member comprising a semi-circular half section and a pair of similarly curved quarter sections flexibly connected together at their adjacent ends, said half and quarter sections being composed of relatively heavy gauge wire, a series of non-metallic spaced sleeves telescoped over said wire, pairs of metal end bearing washers associated with the ends of the non-metallic sleeves, said half and quarter sections and said spaced sleeves extending continuously, and a plurality of cross chains interconnecting the outer circumferential side chain and the inner circumferential member, said cross chains each having hook-like members at their opposite ends for engagement with the outer side chain and the inner circumferential member, said hook-like members engaging the wire portions of the inner circumferential member at spaced points and between the pairs of washers.

2. An anti-skid device according to claim 1, wherein the half section and quarter sections of the inner circumferential member normally remain in a circle.

3. An anti-skid device according to claim 1, wherein the hook-like members of the cross chains which engage the outer circumferential side chain are relatively larger and heavier than the hook-like members at the opposite ends of the cross chains.

4. An anti-skid device for vehicle tires according to claim 1, wherein hook-like members are engaged with the wire of the inner circumferential member at points located between substantially every pair of non-metallic sleeves and metal washers.

5. An anti-skid device according to claim 1, wherein the non-metallic sleeves are formed from rubber or synthetic rubber.

6. An anti-skid device according to claim 5, wherein hook-like members are engaged with the wire of the inner circumferential member at points located between substantially every pair of spaced rubber sleeves and metallic washers.

7. An anti-skid device for vehicle tires, comprising an outer circumferential side chain having a releasable fastener at its separable ends, a plurality of cross chains movably attached at one end and at spaced points to the circumferential side chain, and an inner circumferential member attached at spaced points to the opposite ends of the cross chains, said inner circumferential member including three pieces of wire comprising a half section and two quarter sections movably grouped together at their adjacent ends and normally forming a circle, and a plurality of spaced rubber tubes telescoped over the wire sections and having metallic bearing washers at their opposite ends with the other ends of the cross chains movably connected at spaced points to said inner circumferential member between the adjacent ends of substantially every pair of spaced rubber tubes.

8. An anti-skid device for vehicle tires according to claim 7, wherein the cross chains have hook-like members at their opposite ends in which the hook-like members which engage the wire sections are relatively smaller than the hook-like members which engage the outer circumferential side chain.

9. An anti-skid device for vehicle tires according to claim 7, wherein the ends of the cross chains which engage the wire sections are disposed between pairs of bearing washers and rubber tube ends.

10. An anti-skid device for vehicle tires, comprising an outer circumferential side chain composed of a plurality of links and fastener for the separable ends of said side chain, an inner circumferential member comprising similarly curved sections together forming a circle and being flexibly connected together at their meeting ends, said curved sections being composed of relatively heavy gauge wire, a series of non-metallic spaced sleeves telescoped over said wire, pairs of metal end bearing washers associated with the ends of the non-metallic sleeves, said sections and said spaced sleeves extending continuously, and a plurality of cross chains interconnecting the outer circumferential side chain and the inner circumferential member, said cross chains each having hook-like members at their opposite ends for engagement with the outer side chain and the inner circumferential member, said hook-like members engaging the wire portions of the inner circumferential member at spaced points and between the pairs of washers.

GEORGE W. HORNER.
WALTER R. ROBERTSON, Sr.

REFERENCES CITED

The following references are of record in the file of this patent:

UNITED STATES PATENTS

| Number | Name | Date |
| --- | --- | --- |
| 1,248,212 | Walden | Nov. 27, 1917 |
| 1,293,424 | Hartung | Feb. 4, 1919 |
| 1,989,217 | Sisk | Jan. 29, 1935 |
| 2,444,573 | Mank | July 6, 1948 |